United States Patent
Verma (10) Patent No.: US 6,747,742 B1
(45) Date of Patent: Jun. 8, 2004

(54) MICROSPECTROMETER BASED ON A TUNABLE FABRY-PEROT INTERFEROMETER AND MICROSPHERE CAVITIES

(75) Inventor: Ravi Kant Verma, Pasadena, CA (US)

(73) Assignee: Tanner Research, Inc., Pasadena, CA (US)

( * ) Notice: Subject to any disclaimer, the term of this patent is extended or adjusted under 35 U.S.C. 154(b) by 47 days.

(21) Appl. No.: 10/179,724

(22) Filed: Jun. 24, 2002

Related U.S. Application Data (60) Provisional application No. 60/300,392, filed on Jun. 22, 2001.

(51) Int. Cl.$^7$ .................................................. G01B 9/02
(52) U.S. Cl. ..................... 356/454; 356/452; 356/451; 356/519; 356/486
(58) Field of Search ............................... 356/454, 452, 356/451, 519, 486

(56) References Cited

U.S. PATENT DOCUMENTS

| | | | |
|---|---|---|---|
| 4,622,672 A | * | 11/1986 | Coldren et al. |
| 5,127,731 A | * | 7/1992 | De Groot |
| 5,353,115 A | * | 10/1994 | McIntyre |
| 5,469,279 A | * | 11/1995 | Sharp et al. |
| 5,861,714 A | * | 1/1999 | Wei et al. |
| 6,506,342 B1 | * | 1/2003 | Frankel |
| 6,539,046 B2 | * | 3/2003 | Newman et al. |

\* cited by examiner

*Primary Examiner*—Frank G. Font
*Assistant Examiner*—Khaled Brown
(74) *Attorney, Agent, or Firm*—Christie, Parker & Hale, LLP

(57) ABSTRACT

The present invention is a cost-effective and compact microspectrometer for rapid detection of chemical compounds in the low concentration limit. The invention provides for significantly higher sensitivity compared to conventional spectroscopy techniques (continuous wave and Fourier transform methods) by placing the sample within a high Finesse etalon cavity. An Optical Spectrum Analyzer (OSA) built on either continuous wave (CW-SPEC), or Fourier Transform Absorption Spectroscopy (FT-SPEC) is used to monitor the spectrum from the etalon cavity/sample combination during tuning of the etalon cavity–this information is then used to reconstruct the absorption spectrum.

18 Claims, 10 Drawing Sheets

Prior Art

Prior Art

MICROSPECTROMETER BASED ON A TUNABLE FABRY-PEROT INTERFEROMETER AND MICROSPHERE CAVITIES

CROSS REFERENCE TO RELATED APPLICATION

This application claims the benefit of U.S. Provisional Patent Application No. 60/300,392, filed Jun. 22, 2001, the content of which is incorporated herein by reference.

FIELD OF THE INVENTION

This invention generally relates to absorption spectroscopy and more particularly relates to a micro spectrometer, which provides a profile of the transmission percentage versus wavelength for relatively small volume or low concentration samples.

BACKGROUND

Industry experts agree that the emerging requirements for biological and chemical warfare necessitates a small, portable device capable of detecting trace amounts of various chemicals in air. In some cases, the concentration in air of various biological and chemical reagents of interest may be approximately 0.1 to 10 ppm or less.

Conventionally, chemical detection may be accomplished using absorption spectroscopy. Spectroscopy is used to identify various unknown substances by reading spectroscopic patterns. Absorption spectroscopy relies on the consistent absorption or fluorescence by various compounds at specific wavelengths of light that produce a consistent pattern identifying the substance.

In practice, vibration bands within a molecule selectively absorb wavelengths corresponding to the energy level of the vibration bands. Thus, the absorption spectrum of a chemical compound will typically comprise a series of absorption bands, which are fixed with respect to wavelength and intensity. In practice, each of the absorption bands originates from an interatomic bond within the molecule.

Figure 1:
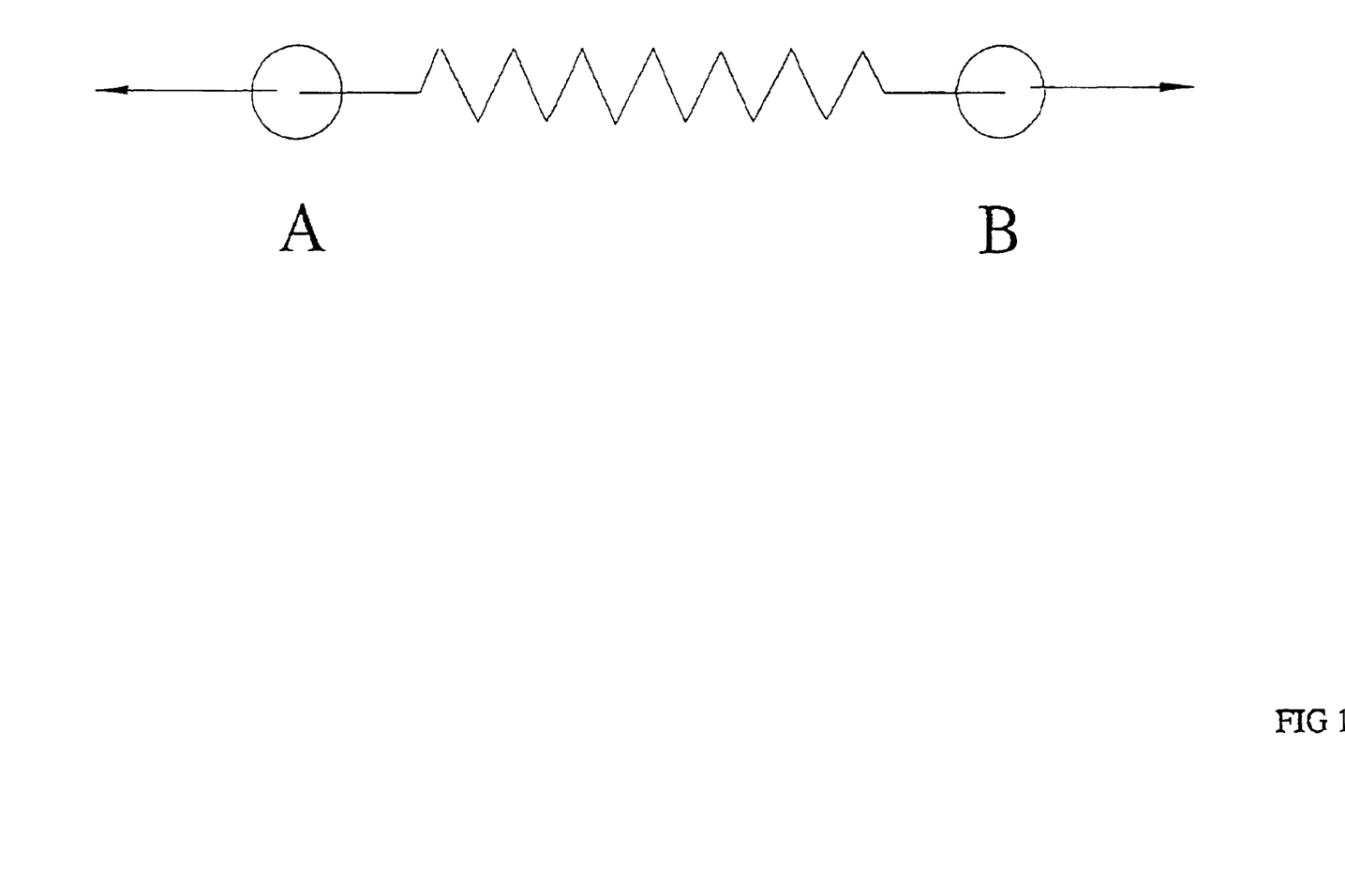
FIG. 1, is a graphic illustration of an interatomic bond in a hypothetical A—B molecule.

For example, FIG. 1 depicts a two-atom compound A—B having an absorption spectrum associated with the stretching of the bond A—B. In this example the absorption frequency is given by Eq. 1 as follows:

$$v = \left(\frac{1}{2\pi c_s}\right)\left[k_f \frac{[M_A + M_B]}{M_A M_B}\right]^{\frac{1}{2}} \quad \text{Eq. (1)}$$

where $v$ is the wavenumber in $cm^{-1}$ of the absorption band [$v$ ($cm^{-1}$)=$10^4/\lambda$, $\lambda$ is the wavelength, where $v$ and $\lambda$ in $cm^{-1}$ and $\mu m$, respectively], $c_s$, is the velocity of light (approximately $3\times10^{10}$ cm/s), $M_A$ and $M_B$ are the masses of the two atoms (A and B respectively), and $k_f$ is the spring constant of the bond. Thus, as the bond stiffness increases, the wavelength of the corresponding absorption band decreases. In general, a molecule with N atoms will comprise 3N-6 normal absorption bands, each with a distinct absorption frequency.

The intensity of the absorption band is governed by a number of factors as provided in Eq. 2:

$$\int_{band} \ln\left(\frac{I_o}{I}\right) dv = A_s cb \quad \text{Eq. (2)}$$

$$A_s = \left[\frac{8\pi^2 N_A}{3\hbar c_s}\right] v \left|\frac{\partial \mu}{\partial Q_s}\right|^2$$

where, $I_o$ and $I$ are the intensities of the incident and transmitted light, respectively, c is the concentration (moles/liter), b is the path length (cm), h is Planck's constant (approximately $6.63\times10^{-34}$), $N_A$ is Avogadro's umber ($6.23\times10^{23}$) and $\mu$ is the dipole moment, where the integration is taken over the entire absorption band and the partial derivative refers to the derivative in normal coordinate space.

Thus, Eq. 2 effectively states that the two non-atomic factors that affect the intensity of the absorption band are the sample concentration and the optical path length. However, the signal to noise ratios in typical absorption signals is relatively low making it difficult to provide instrumentation capable of detecting relatively weak absorption bands.

For example, absorption spectroscopy has historically been performed in the continuous wave spectroscopy (CW-SPEC) mode. In this instance a sample of interest is irradiated with white light and the transmitted light is spatially resolved into separate wavelengths (e.g. by the use of a Fiber Bragg grating, or by the use of dispersive prisms). A photodetector may measure the separate wavelengths providing the transmission spectrum. Alternately, the incident light is temporally resolved into different wavelengths (e.g., by the use of a rotating prism and a white light source), and the transmitted light is measured by a photodetector. This approach is limited in sensitivity because most of the energy generated by the light source is discarded by the dispersive mechanisms used.

Figure 2:
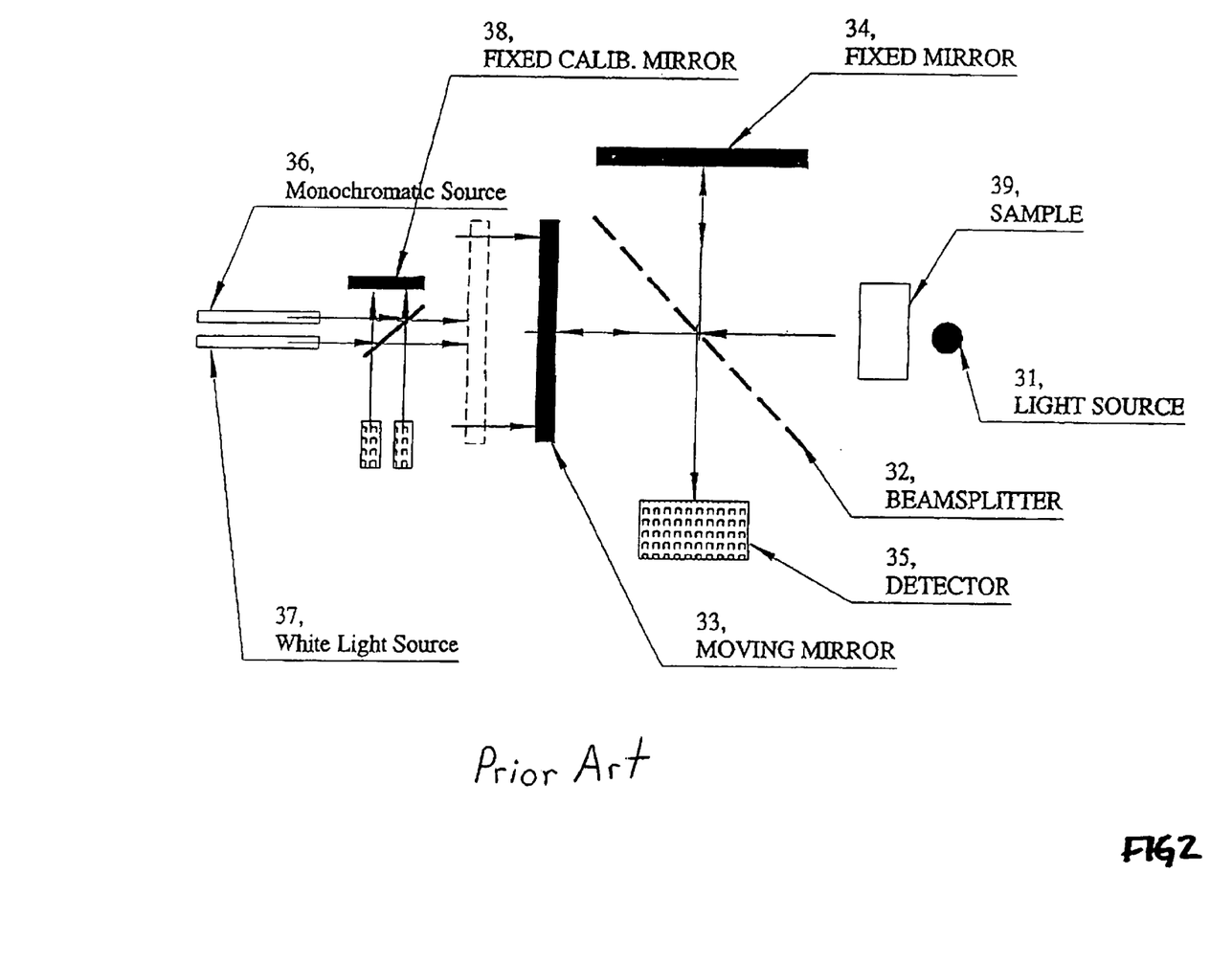
FIG. 2, is a simplified schematic diagram of a Michelson interferometer.

More recently Fourier Transform absorption spectroscopy, (FT-SPEC), has been used to improve the measurement sensitivity by continuously detecting all the wavelengths. This technique was enabled by the development of the Michelson interferometer as illustrated in FIG. 2. Generally a Michelson interferometer may comprise a fixed mirror 34 and a moving mirror 33. In practice a light source 31 may be used to generate white light, which is collimated onto a sample 39, and then onto a beamsplitter 32.

Figure 3:
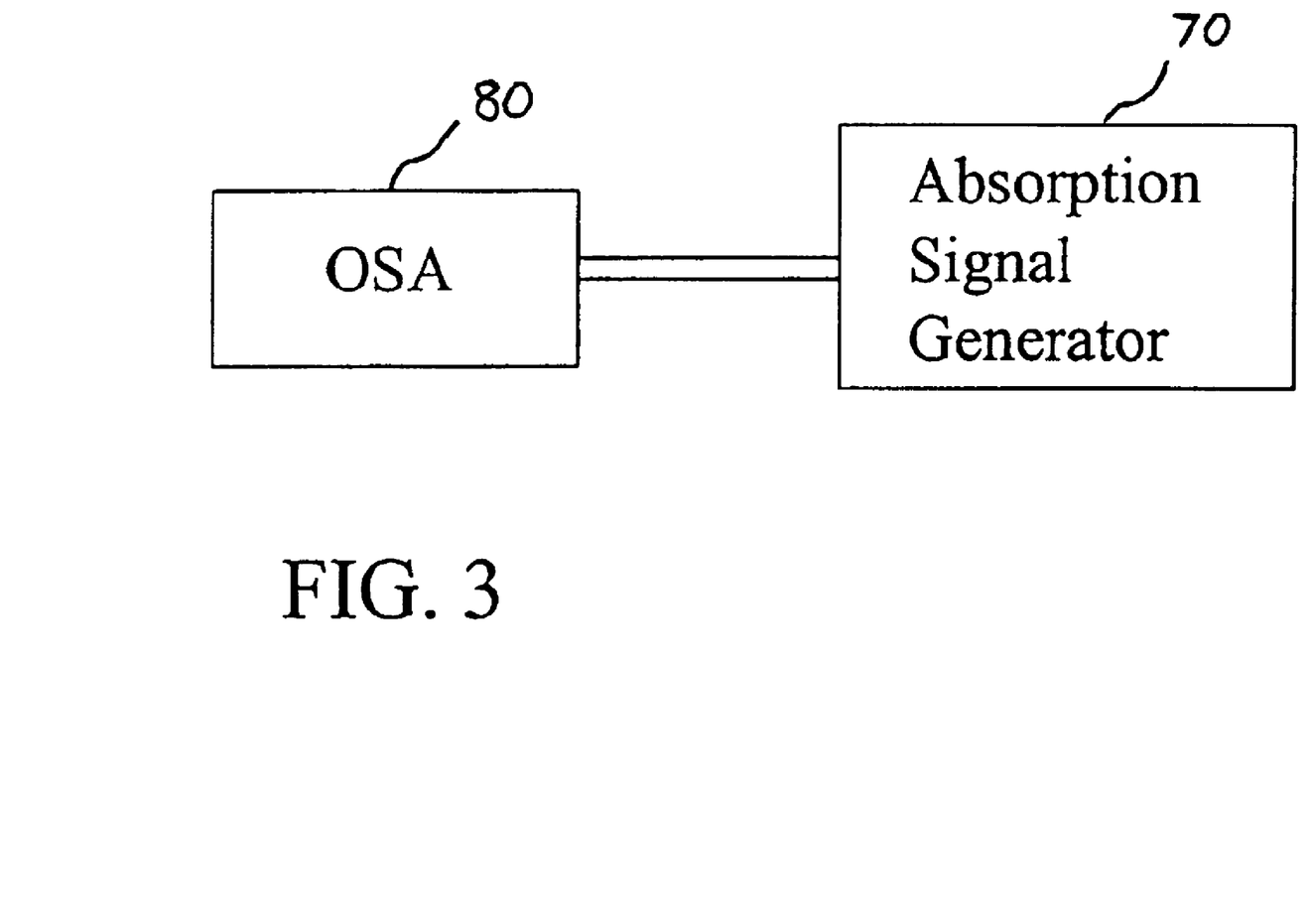
FIG. 3 is a simplified block diagram of a absorption spectrometer formed by an absorption signal generator coupled to an optical spectrum analyzer in accordance with an exemplary embodiment of the present invention.

The beamsplitter 34 divides the incident beam into two separate optical beams, one of which is incident on the moving mirror 33, and the other is incident on the fixed mirror 34. In practice each of the mirror are reflective at the wavelengths of interest and reflect the incident beams back to the beamsplitter where they are combined and forwarded to a detector 35. In operation, the lengths of the two optical paths are different so that the intensity of the recombined light varies in accordance with the constructive and destructive interference of the two beams as given by Eq. 3.

$$I_x = \int_v A_v(1 + \cos\{2\pi vx\}) dv \quad \text{Eq. (3)}$$

where $A_v$ is the intensity of the incident, unmodulated light, and x is the path length difference. Eq. 3 represents a Fourier transform of the intensity of the incident beam $A_v$ so that the intensity of the incident beam, $A_v$, may be estimated from the inverse FFT of the intensity of the recombined optical beam $I_x$. Typically a calibration interferometer having a monochromatic light source 36, and a white light source 37 may be used to calibrate the Michelson interferometer as illustrated in FIG. 3.

This technique is called Fourier transform spectroscopy because the transmission spectrum of the sample is obtained as the inverse Fourier transform of the raw detector output. Fourier transform spectroscopy typically provides improved sensitivity compared to CW-SPEC instruments (with similar detectors and light source instrumentation).

Both CW-SPEC and FT-SPEC instrumentation are widely available and used in the academia and industry. Unfortunately, both CW-SPEC and FT-SPEC are unsuitable for detection of samples in the small size limit (i.e. when the concentration in air is approximately 0.1 ppm, or the total sample size is approximately 1 nano-liter or less). The detection limit in absorption spectroscopy is given by the minimally detectable absorption determined by the signal-to-noise ratio of the measurement instrumentation.

Consider an optical radiation at a frequency v and power P incident on a collection of N molecules (the sample). If the N molecules absorb a fraction of the incident power η (η<<1), and the rest is transmitted to a detector of quantum efficiency β, and the incident power is below the saturation intensity, then the detector current is given by Eq. 4.

$$I_D = \frac{P(1-\eta)e\beta}{\hbar v} \qquad \text{Eq. (4)}$$

and the signal $I_s$ (the change in detector current due to absorption) is given by Eq. 5 as follows:

$$I_S = \frac{P\eta e\beta}{\hbar v} \qquad \text{Eq. (5)}$$

If absorption is due to an atomic transition with resonance frequency $v_o$, then the fraction of the absorbed incident power η can be written as Eq. 6.

$$\eta = \frac{N\sigma}{A} \qquad \text{Eq. (6)}$$

where a $\sigma = \sigma_o K$, $\sigma_o$ is the resonant cross section of the particular transition of interest; and K is a factor less than one that represents the reduction in cross section due to the radiative decay of the transitions into atomic states other than the lower state of the transitions of interest, Doppler broadening, collisional broadening, detuning of the source away from $v_o$ and the finite bandwidth of the radiation source.

Thus, the signal to noise ratio is given by Eq. 7 as follows:

$$\frac{S}{N} = \frac{I_S}{i_n} = \frac{N\sigma_o Ke\beta P/A\hbar v}{\left[i_d^2 + i_t^2 + \frac{2e^2\beta P\Delta v}{\hbar v_o}\right]^{\frac{1}{2}}} \qquad \text{Eq. (7)}$$

In Eq. 7, the three statistically independent sources of noise in the system include the detector noise ($i_d$), the radiation source technical noise ($i_t$) and the shot noise in the detection system given by:

$$i_{sh}^2 = 2eI_D\Delta v = \frac{2e^2\beta P\Delta v}{\hbar v_o}$$

Thus, the S/N ratio can be increased by increasing the source power P. This approach is limited to power levels below the saturation limit governed by:

$$\frac{\sigma_o KP}{A\hbar v_o} \cong \frac{\gamma}{2};$$

where 1/γ is the radiative lifetime of the upper transition state. In practice the numerator in Eq. 7 remains relatively constant but the shot noise in the detection system $i_{sh}$ continues to increase for power levels above the saturation limit, thereby reducing the S/N ratio.

Alternatively the signal to noise ratio may be improved by increasing the quantum efficiency β, of the detector as well the detection bandwidth Δv or by reducing the detector noise $i_d$ or the radiation source technical noise. The detector noise $i_d$ is generally given by:

$$i_d = 4k_B T\Delta v/R_D,$$

and can be reduced by reducing the absolute temperature T. The radiation source technical noise can be reduced by frequency modulation schemes.

In addition the signal to noise ratio may also be improved working with transitions with small radiative upper state lifetimes (and thus a higher saturation limit), a large cross section, and K close to 1 or by increasing the number of molecules N in the sample.

SUMMARY OF THE INVENTION

The present invention provides instrumentation for chemical detection. In one aspect the present invention enhances the sample-electromagnetic wave interaction by the use of an absorption enhancement signal apparatus, such as, for example, a Fabry-Perot etalon cavity.

In an exemplary embodiment a sample is placed inside a Fabry-Perot etalon cavity, which is then irradiated with a broadband white light source, and tuned such that one of the transmission peaks of the etalon scans across an absorption band in the sample. The power spectrum of the transmitted profiles are measured with an optical spectrum analyzer during the etalon tuning operation, and the height of the transmission peak measured as a function of its wavelength and etalon tuning. From this, an absorption spectrum of the sample is reconstructed.

In another aspect of the present invention an absorption spectrometer includes an absorption signal generator having a cavity for receiving a sample, wherein an input optical beam traverses a multi-bounce optical path across the sample from an input of the cavity to an output of the cavity and an optical spectrum analyzer coupled to the output of the cavity measures the intensity of the cavity output as a function of wavelength

BRIEF DESCRIPTION OF THE DRAWINGS

These and other features, aspects and advantages of the present invention will be more fully understood when considered with respect to the following detailed description, appended claims, and accompanying drawings where:

DETAILED DESCRIPTION OF THE INVENTION

An exemplary embodiment of the present invention provides a cost-effective solution for detection of chemical compounds in the low concentration limit. The described exemplary embodiment is compact, and readily transportable and does not require complex instrumentation to relatively rapidly detect small concentrations of chemical compounds. As illustrated in FIG. 3, the present invention may comprise an absorption signal generator 70 for generating a relatively high intensity absorption signal and an optical spectrum analyzer (OSA) 80 optically coupled to the absorption signal generator for measuring the enhanced signal.

Figure 4:
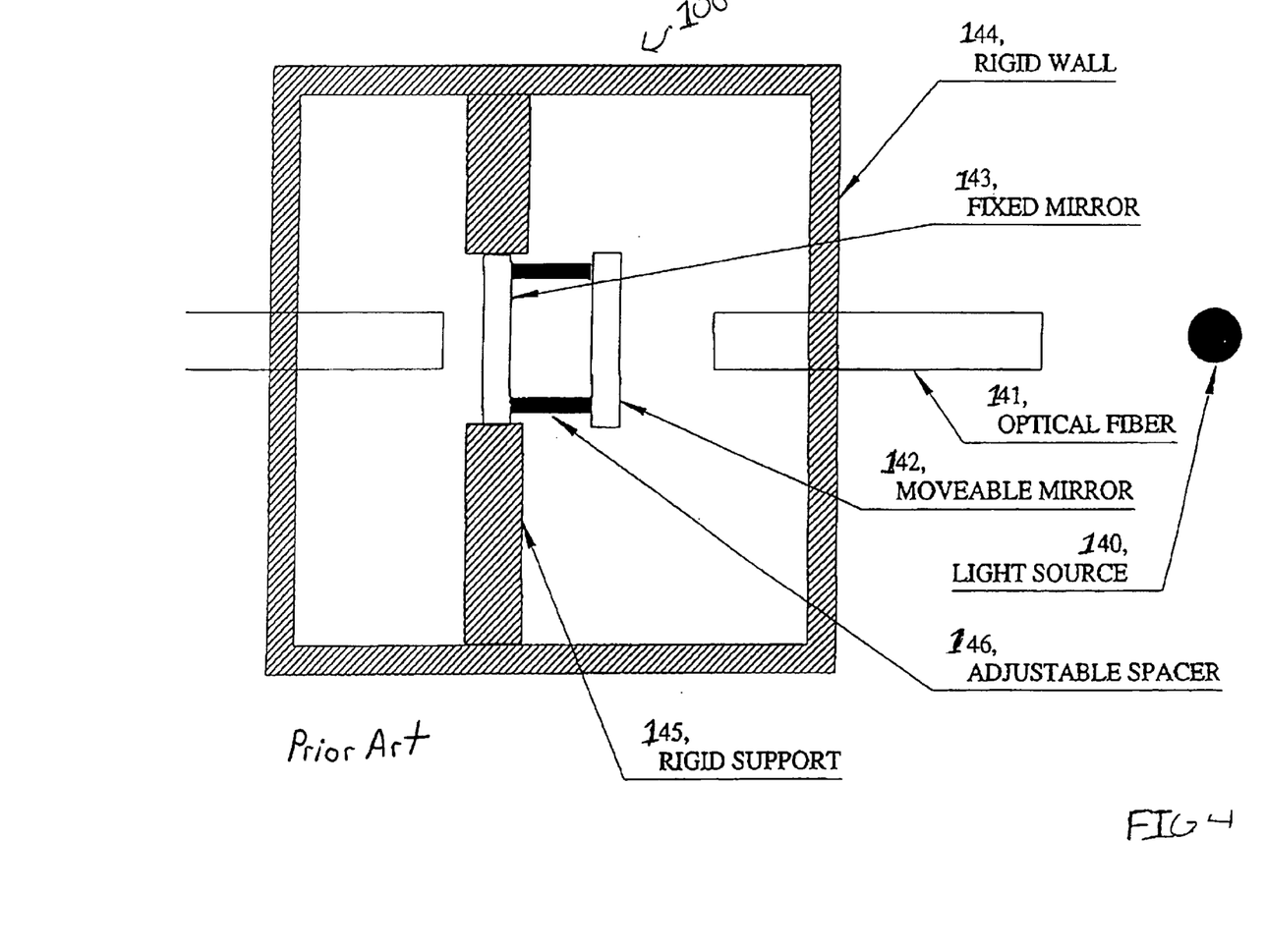
FIG. 4, is a simplified schematic diagram of a Fabry-Perot etalon cavity.

In an exemplary embodiment of the present invention, the absorption signal generator 70 may comprise a Fabry-Perot etalon 100 coupled to a light source 140 as illustrated in FIG. 4. Fabry-Perot etalons, as known in the art comprise two substantially parallel mirrors with relatively high reflectivity (r; typically r>0.9), low transmission (t) and low loss due to scattering and absorption (s where s<<r and usually s<<t). One of skill in the art will appreciate that the etalon mirrors may be curved so that the present invention is not limited to the substantially planar mirrors illustrated in FIG. 4.

In the described exemplary embodiment the light source 140, may comprise a tunable laser source or a broadband white light source coupled to an optical fiber 141 that illuminates a mirror 142 of the etalon. In the described exemplary embodiment, one of the mirrors 143 may be coupled to a device frame 144 via rigid supports 145 and adjustable spacers 146 may translate the second mirror 142 relative to the first mirror 143 to adjust the relative optical distance between the two mirrors.

In the described exemplary embodiment, the two mirrors are maintained substantially parallel to each other (the angle between them is preferably less than about 5 $\mu$rad) to provide a relatively high finesse (i.e. the peak separation divided by Full Width at Half Maximum Height) cavity. In addition, an exemplary embodiment of the present invention may include feedback control (not shown) of the adjustable spacers 46 to maintain the parallelism between the mirrors during mirror translation.

The mirrors of the described exemplary Fabry-Perot cavity may be fabricated by depositing a partially reflective layer (e.g. Silver, Gold, or a multi-layer dielectric material) on any one of a variety of substrate materials. For example, the etalon mirrors may comprise polished optical quality glass for applications in the visible region of the optical spectrum, Quartz for UV applications, and Silicon for IR application. In the described exemplary embodiment, micromotors or standard MEMS fabrication methods may be used to provide mirror separation and alignment. In addition micro-positioning motors, or MEMS actuation devices based on electrostatic, magnetic, or thermal expansion may be used to translate one of the mirrors to provide the necessary cavity tuning.

In operation, the optical fiber 141 transmits a light beam of wavelength $\lambda$, and intensity $I_o$ on the etalon cavity formed by the two mirrors 142 and 143. The incident light beam is injected into the cavity in the form of photons, where the number of photons is proportional to the intensity of the incident beam. In operation, a portion of the light is reflected back and forth between the partially reflective parallel surfaces of the two mirrors. The reflected light beams interfere, either constructively or destructively, with each other, and thus alter the overall intensity of the light passing through the etalon.

Figure 5:
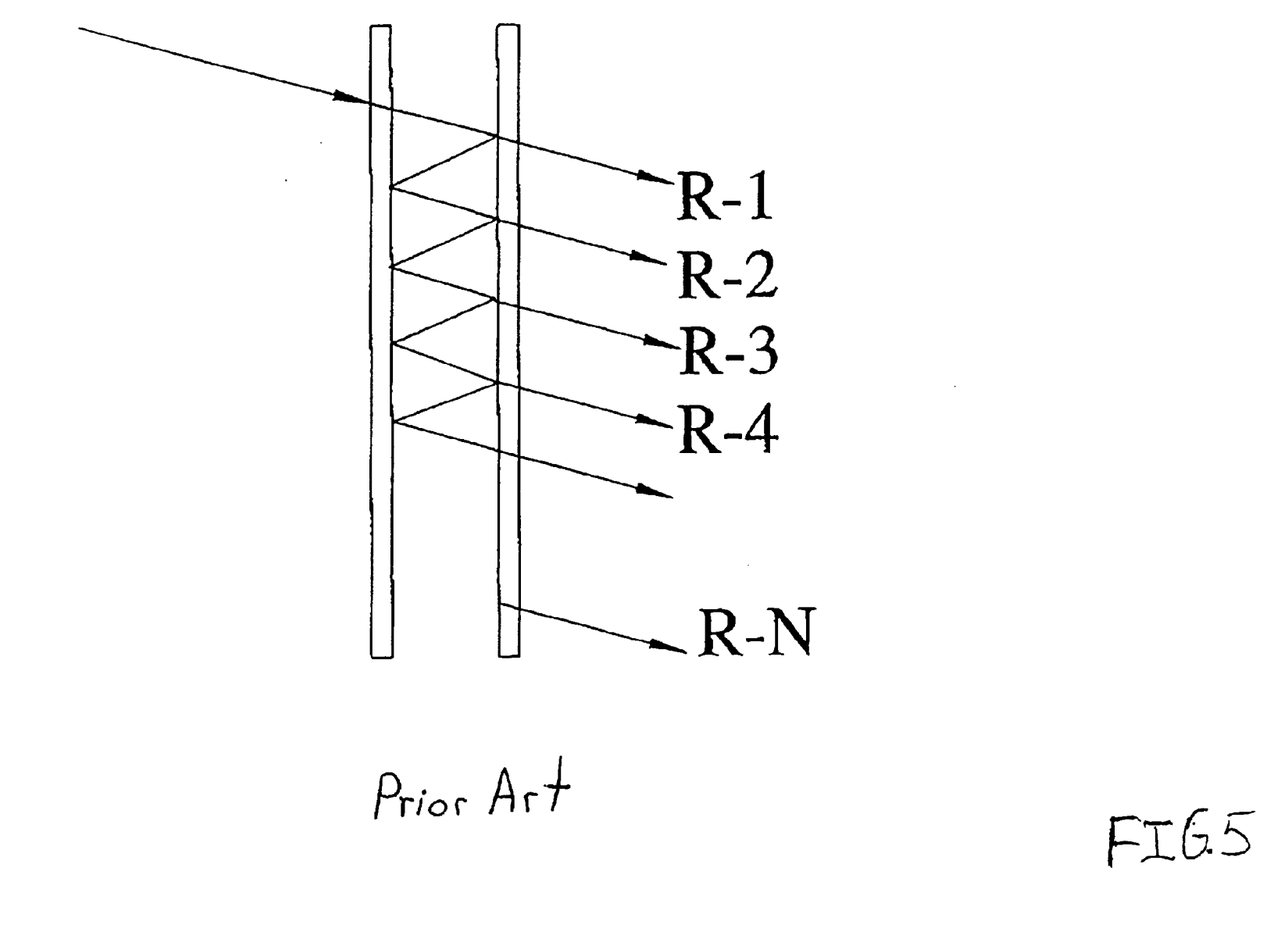
FIG. 5, is a graphic illustration of a ray trace of the passage of the optical beam through the etalon cavity.

In practice, the number of transmitted photons at each reflection is equal to the transmission coefficient (t) multiplied by the number of incident photons at that reflection. The amplitude and reference phase of the resultant electromagnetic wave are proportional to the number of emitted photons and the path distance of the photons in the etalon cavity prior to emission, respectively. As illustrated in FIG. 5, the Fabry-Perot etalon transmits several electromagnetic waves of different reference phases, and progressively lower amplitudes are emitted (R-1, R-2, R-3 etc).

The different emitted rays have different amplitudes and phase angles. The wavelength corresponds to a phase angle $\delta$, for an optical gap d ($\delta = 2\pi n d / \lambda$; where n is the refractive index of the material between the two mirrors). If N photons are injected in the optical cavity through the first mirror, then (Nt) photons are ejected from the second mirrors after the first pass, (Nt$r^2$) after the second pass, (Nt$r^4$) after the third pass, and so on. The phase angles for these waves are zero (for the reference wave), 2$\delta$ and 4$\delta$, and so on.

Figure 6:
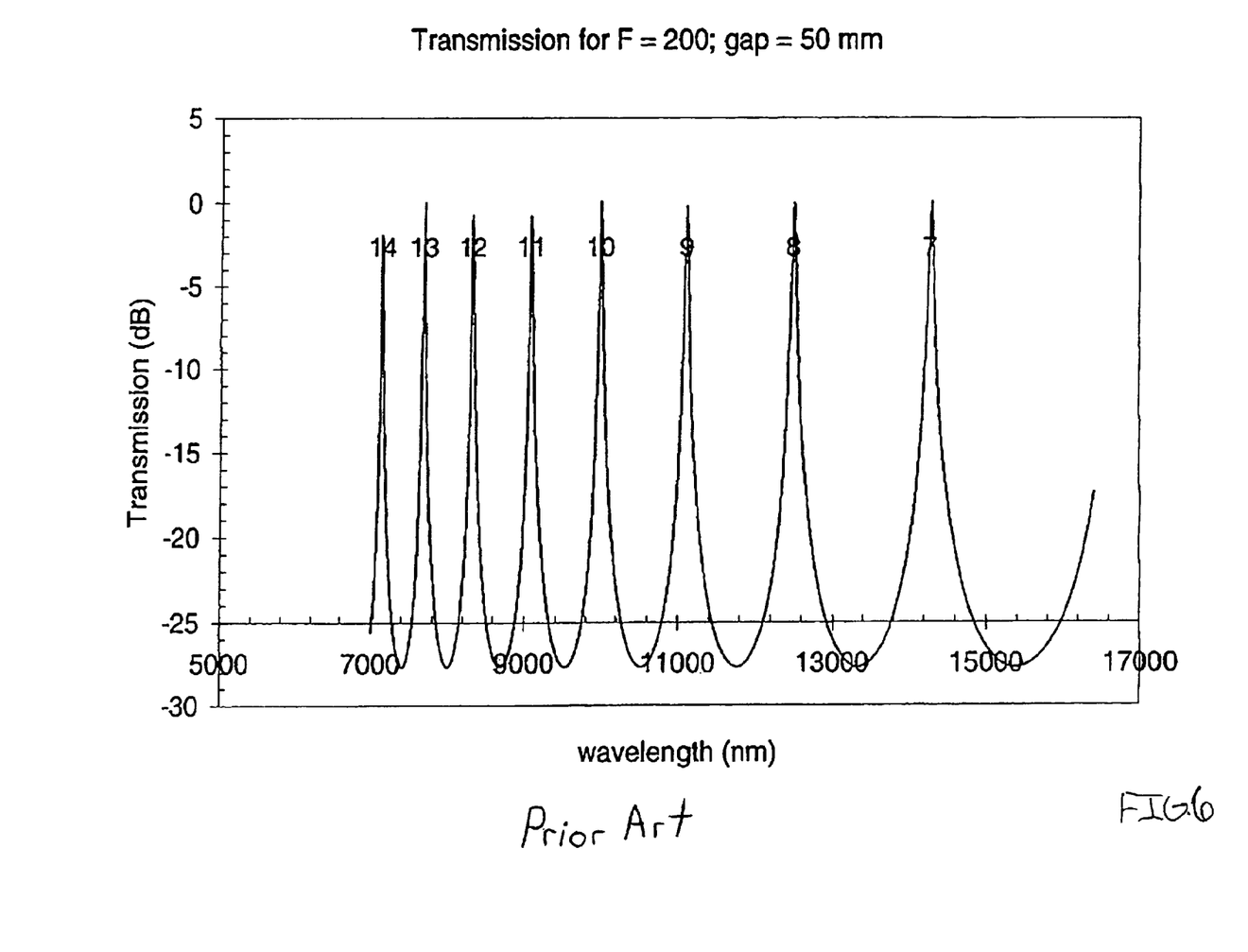
FIG. 6, is a graphic illustration of the transmission profile from a Fabry-Perot etalon cavity.
Figure 7:
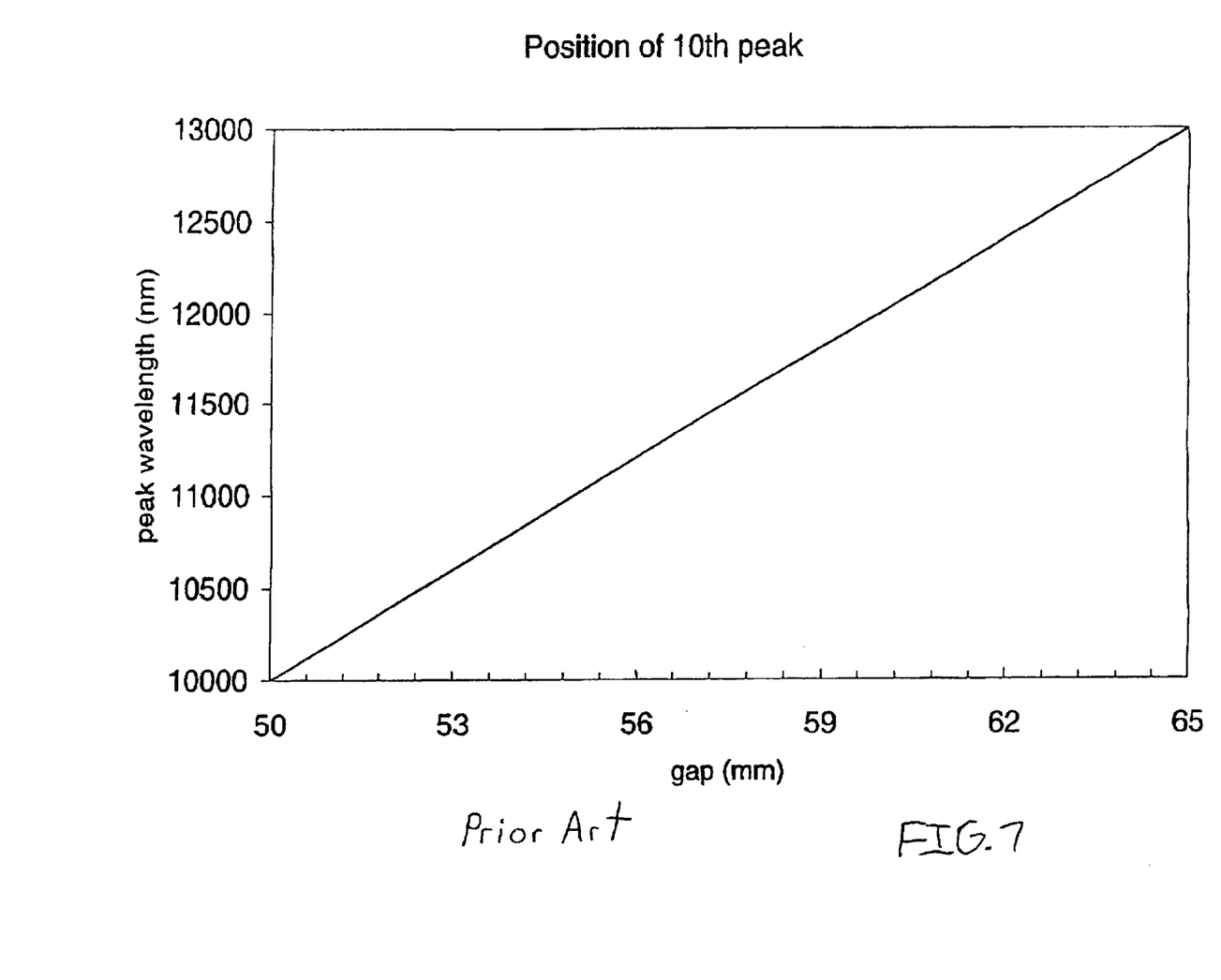
FIG. 7 is a graphic illustration of the change in the position of the transmitted peak as the optical gap of the Fabry-Perot cavity is changed.

As depicted in FIG. 6, the transmission spectrum of a Fabry-Perot cavity typically comprises a series of periodic transmission peaks, corresponding to different integer values of 2d/$\lambda$ so that the positions of the transmission peaks depend on the path distance between the two mirrors. In practice the $n^{th}$ transmission peak can be shifted in wavelength (tuned) by changing the optical spacing or gap between the two mirrors. For example, as depicted in FIG. 7, the position of the $10^{th}$ peak shown in FIG. 6 changes from 10000 nm to 13000 nm when the optical spacing between the two mirrors (d) changes from 50 mm to 65 mm.

Figure 8:
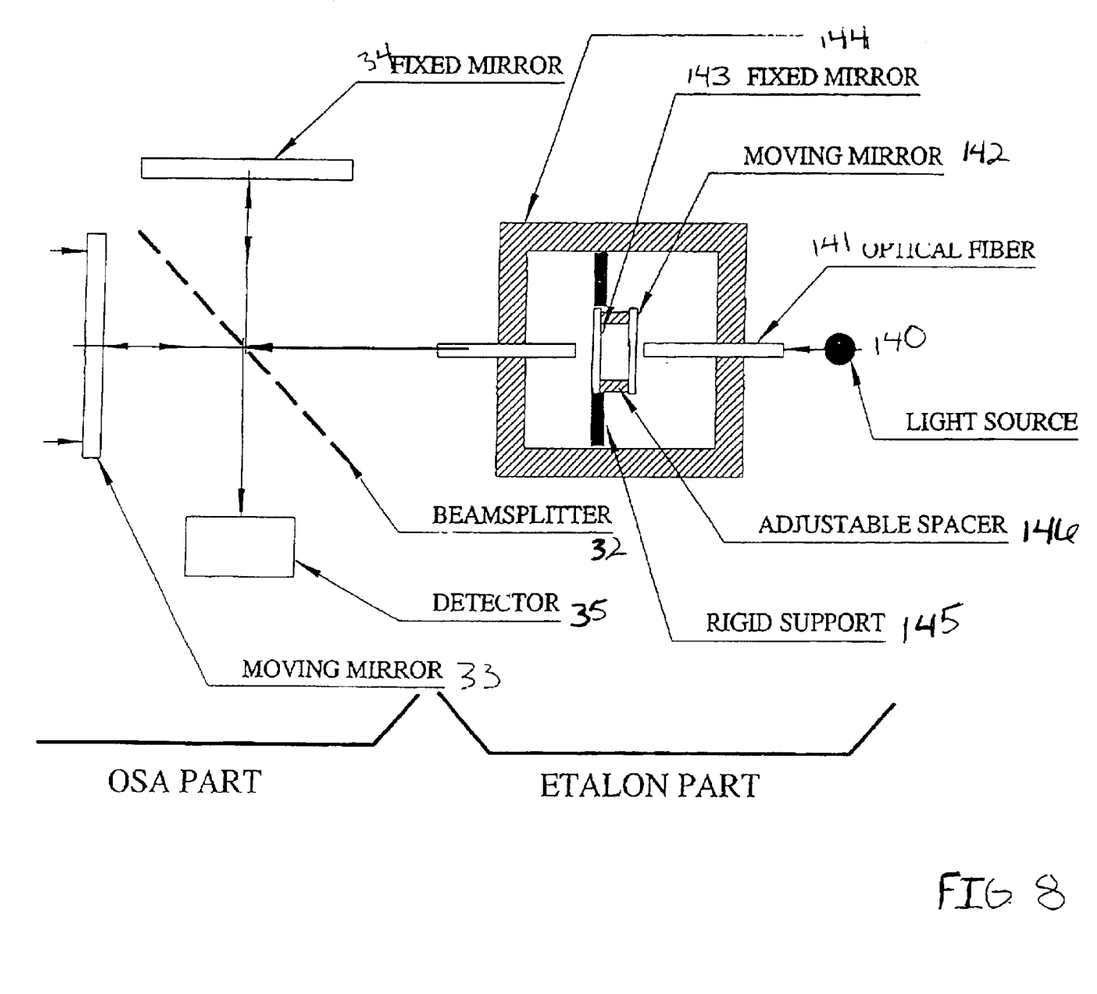
FIG. 8 is a simplified schematic diagram of the absorption spectrometer of FIG. 3 wherein the absorption signal generator comprises a Fabry-Perot etalon in accordance with an exemplary embodiment of the present invention.

In the described exemplary embodiment, a sample may be placed in the etalon cavity and illuminated by the light source. In operation, the incident light traces a multi-bounce optical path across the sample in the cavity. In the described exemplary embodiment an optical fiber couples the light transmitted out of the etalon to the OSA as illustrated in FIG. 8. In one embodiment the OSA may comprise, for example, a Michelson interferometer as illustrated in FIG. 8.

One of skill in the art will appreciate however, that any of a variety of spectrum analyzers may be used to measure the transmission spectrum of the absorption signal generator (see FIG. 3). For example, the OSA may comprise a white light source, a fiber Bragg grating and a linear photodetector array. Alternatively, the OSA may comprise other CW-SPEC methods, or an FT-IR method.

In operation, the adjustable spacer 82 may translate the moveable mirror 142 of the Fabry-Perot etalon relative to the fixed mirror 143 with the sample installed in the cavity. In the described exemplary embodiment the wavelength transmission spectrum output by the Fabry-Perot etalon, comprising a periodic series of transmission peaks, is measured by the OSA. In an exemplary embodiment of the present invention, the mirror translation is preferably sufficient to ensure that the wavelength of one of the transmission peaks scans across an absorption band of the sample. This transmission peak may be significantly attenuated due to the multi-bounce reflections through the sample within the etalon optical cavity.

For example, in one embodiment, the mirror separation is varied a distance that is equal to or greater than the wavelength separation between tuning peaks to ensure that the entire spectrum is scanned. In addition, the height of the remaining transmission peaks that do not scan across an absorption band are relatively undistorted.

An exemplary embodiment of the present invention may further comprise a processor 90 coupled to the OSA (see FIG. 3) that monitors the intensity of the transmission spectrum as a function of wavelength, which changes as the etalon cavity is tuned (i.e. the optical spacing between the mirror is varied). In accordance with an exemplary embodiment the processor may construct the absorption spectrum of the sample in accordance with the intensity of the transmission peak measured as a function of its wavelength and etalon tuning.

In practice the detection limit in absorption spectroscopy is given by the minimally detectable absorption determined by the signal-to-noise ratio of the measurement instrumentation. In the described exemplary embodiment an average photon may traverses a multi-bounce optical path between the partially reflective surfaces of the etalon cavity before being transmitted out the etalon and coupled to the OSA.

Thus, a sample with a wavelength dependent transmission coefficient $a_\lambda$ placed within the cavity of the Fabry-Perot etalon is traversed several times by an average photon as it is reflected within the cavity. Therefore, the absorption signal measured by the OSA may be significantly attenuated as compared to a conventional system where the sample under measurement is located outside the etalon cavity and traversed only once.

For example, the intensity of the transmission spectrum of the described exemplary Fabry-Perot etalon with a sample having a wavelength dependent transmission coefficient $a_\lambda$ within the etalon cavity may be summarized as in Eq. 8 as follows:

$$I = N \frac{\left(\frac{t^2 a_\lambda^2}{1-a_\lambda^2 r^2}\right)}{1+\left(\frac{2a_\lambda^2 r}{1-a_\lambda^2 r^2}\right)^2 \operatorname{Sin}^2 \delta} \quad \text{Eq. (8)}$$

Comparing the cases where $a_\lambda=1$ (i.e. there is no sample within the Fabry-Perot cavity) to one in which there is a weakly absorbing sample ($a_\lambda=1-s_\lambda$, where $s_\lambda$ is the weak absorption due to the sample), it is evident that the present invention may provide significantly enhanced sensitivity.

Figure 9:
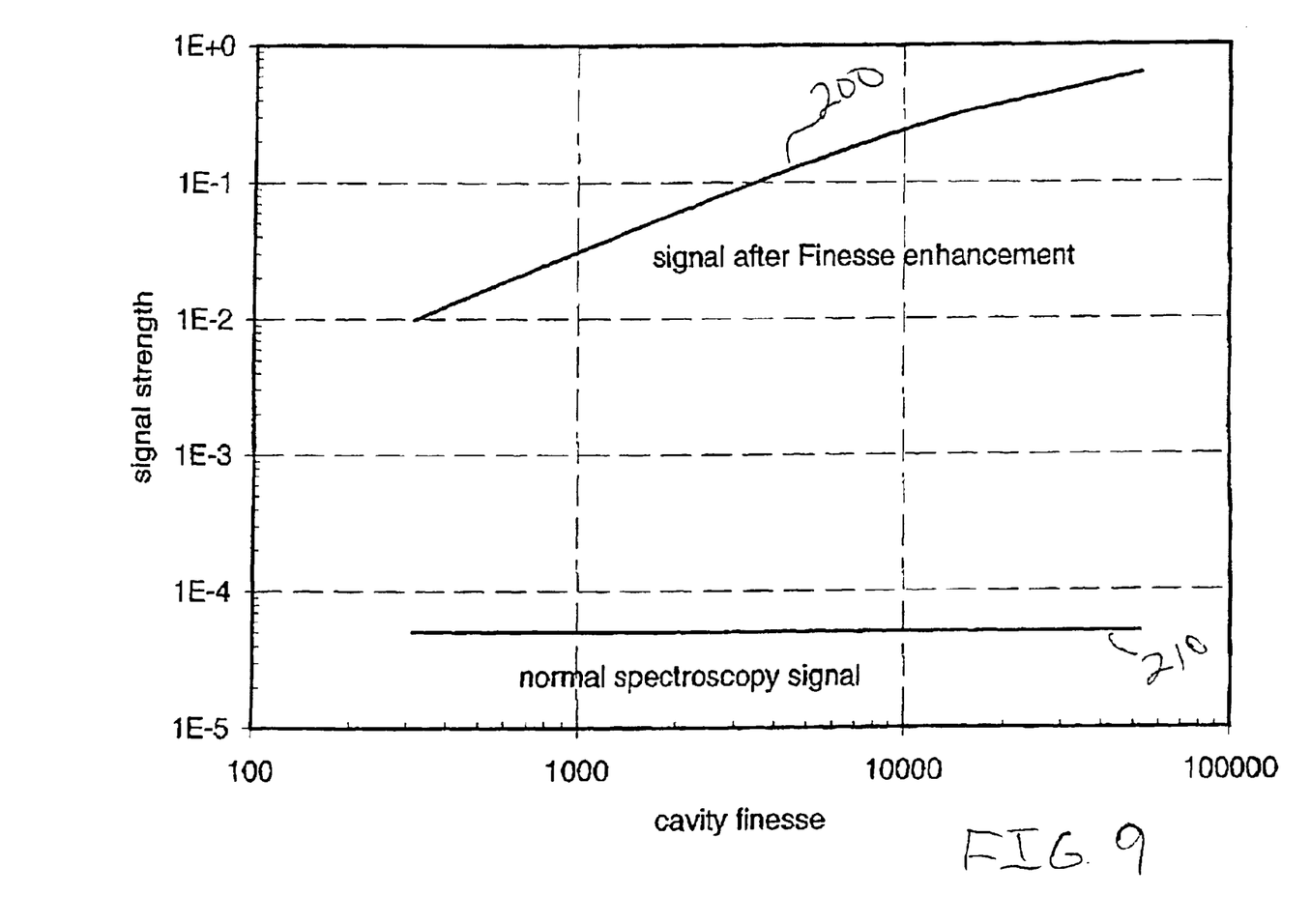
FIG. 9, is a graphic illustration of the absorption signal strength as a function of cavity finesse in accordance with an exemplary embodiment of the present invention.

For example, FIG. 9 graphically illustrates the level of absorption (i.e. absorption signal strength) as a function of finesse of the etalon cavity. In practice the finesse enhancement of absorption signal strength provided by the present invention 200 may be quite significant for a transmission peak that is scanned across the absorption band of the sample in a high finesse etalon cavity.

However, the absorption signal strength 210 of a conventional one pass system having the sample outside the etalon cavity may be orders of magnitude less than the absorption signal strength provided by the present invention. Presently, etalons having substantially planar mirrors may have finesse values up to approximately $1.9 \times 10^5$ so that the present invention may afford significant signal enhancement as compared to conventional one pass systems.

One of skill in the art will appreciate that the present invention is not limited to Fabry-Perot etalons. Rather alternate structures may be used to generate an enhanced absorption signal. For example, the absorption signal generator may comprise a silica microsphere cavity, which may provide a higher finesse value than the described exemplary two-mirror cavity.

Figure 10:
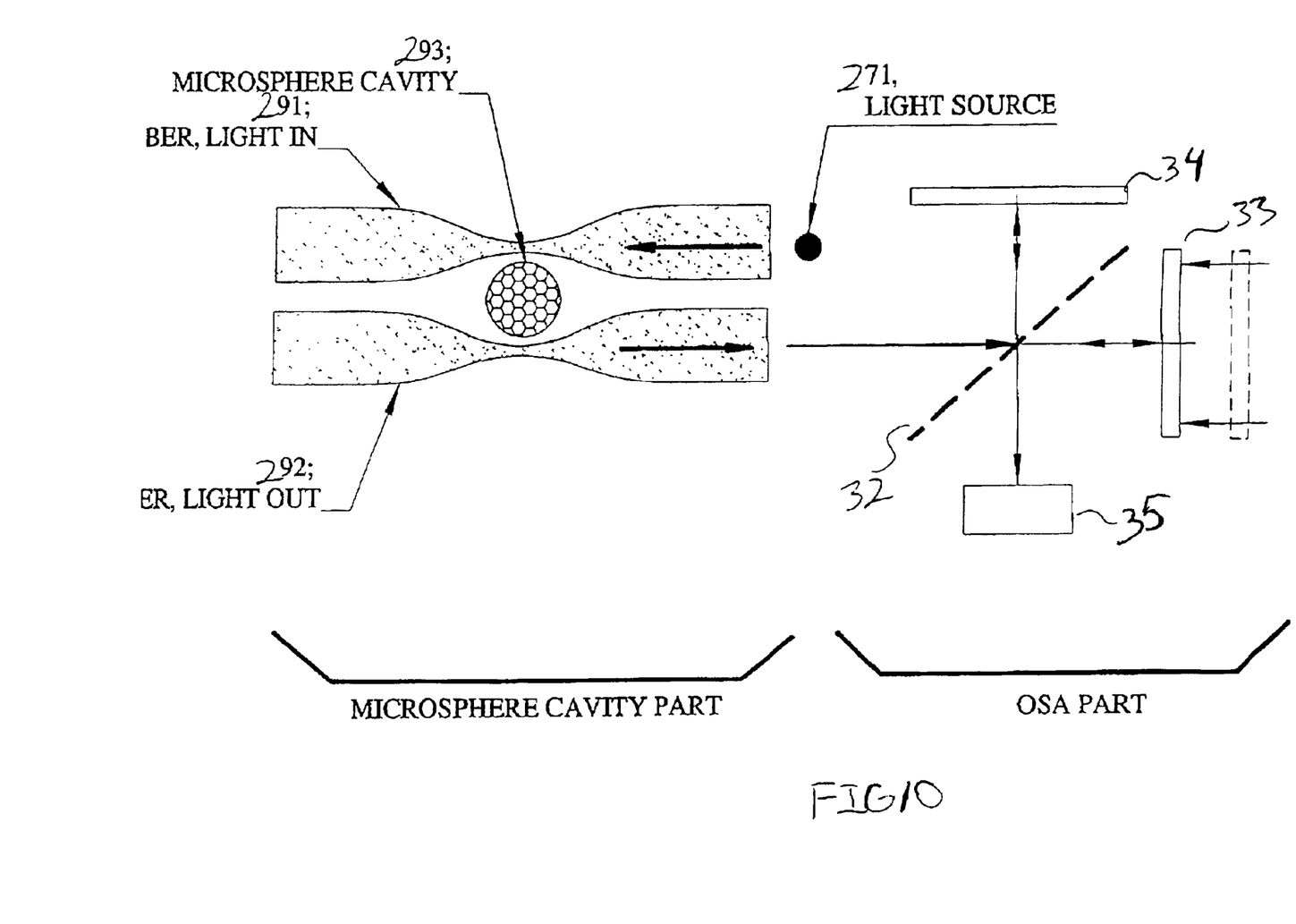
FIG. 10 is simplified schematic diagram of the absorption spectrometer of FIG. 3 wherein the absorption signal generator comprises a micro-sphere cavity in accordance with an exemplary embodiment of the present invention.

For example, FIG. 10 illustrates another embodiment of the present invention wherein a micro-sphere cavity generates an enhanced absorption signal. In this embodiment, the absorption signal generator comprises a light source 271 coupled to a first tapered optical waveguide 292 that couples the light into a microsphere cavity 293, and a second tapered optical waveguide 292 that couples the light transmitted out of the microsphere cavity to an OSA 80.

The nominal output from the microsphere cavity resembles the transmission spectrum from the Fabry-Perot etalon device (see FIG. 6), except that the peaks are much narrower. Therefore, a sample placed around the microsphere cavity with an absorption peak wavelength corresponding to the wavelength of one of the transmission peaks of the transmission spectrum significantly attenuates that transmission peak. In addition, finesse values of about $1 \times 10^8$ can be achieved for silica-microsphere cavities. Therefore, the alternate embodiment of the present invention may provide a significantly enhanced absorption signal.

In practice the wavelength of the intensity peaks in the output spectrum of the microsphere cavity is determined by the radius of the micro-sphere. Therefore, an exemplary embodiment of the present invention may comprise an oval shaped micro-sphere cavity, which may be translated perpendicular to the plane of the paper of FIG. 10, thereby changing the effective radius of the microsphere and tuning the transmission peaks of the device. Again the translation distance is preferably sufficient to ensure that one of the transmission peaks scans across the absorption band of the sample placed around the cavity.

In accordance with an exemplary embodiment, the effective radius of the oval shaped microsphere cavity may be changed by manipulating the position of the microsphere cavity with respect to the optical waveguides, either with micro positioning motors, or with one of several MEMS based actuation devices based on electrostatic, magnetic, piezo, or thermal expansion drives. In an exemplary embodiment the transmission spectrum may be monitored either via the second coupling optical waveguide that is positioned close to the silica microsphere. Alternatively, the reflectance spectrum may be monitored via the same coupling fiber.

In accordance with an exemplary embodiment, the transmission peak of interest can be isolated with a Fiber Bragg grating, or with a Fabry-Perot filter or a combination of two cut off filters. The total intensity is then integrated in a photodiode, and used as a measure of sample absorbance. Alternatively, the entire spectrum may be monitored by an optical spectrum analyzer such as the Michelson FTIR as illustrated in FIG. 10, or by a device based on either a Bragg grating, or a Fabry Perot filter.

The described exemplary microsphere cavity may be fabricated in accordance with existing manufacturing techniques. For example, the micro-sphere cavity may be formed by heating a silica fiber tip in a $CO_2$ laser, or in a gas flame. The silica fiber can then be used to grab the microsphere cavity for subsequent manipulation. The microsphere cavity may then be positioned close to the coupling fibers using MEMS based positioning guides or micro positioning motors.

The invention described herein will itself suggest to those skilled in the various arts, alternative embodiments and solutions to other tasks and adaptations for other applications. It is the applicants' intention to cover by claims all such uses of the invention and those changes and modifications that could be made to the embodiments of the invention herein chosen for the purpose of disclosure without departing from the spirit and scope of the invention.

What is claimed is:

1. An absorption spectrometer, comprising:
   an absorption signal generator comprising a cavity for receiving a sample, wherein an input optical beam traverses a multi-bounce optical path across said sample from an input of said cavity to an output of said cavity; and
   an optical spectrum analyzer coupled to the output of said cavity for measuring intensity of said cavity output as a function of wavelength.

2. The absorption spectrometer of claim 1 wherein the cavity output comprises a periodic series of intensity peaks as a function of wavelength that are responsive to length of the multi-bounce optical path.

3. The absorption spectrometer of claim 2 wherein the absorption signal generator further comprises tuning means for varying length of said multi-bounce optical path.

4. The absorption spectrometer of claim 1 wherein the absorption signal generator comprises a Fabry-Perot etalon.

5. The absorption spectrometer of claim 4 wherein said Fabry-Perot etalon comprises first and second partially reflective mirrors, wherein said cavity is formed by space between said first and second mirrors.

6. The absorption spectrometer of claim 5 wherein said Fabry-Perot etalon further comprises an adjustable spacer coupled to said first and second partially reflective mirrors for varying spacing between said mirrors.

7. The absorption spectrometer of claim 6 wherein the cavity output comprises a periodic series of intensity peaks responsive to length of the multi-bounce optical path formed between said first and second partially reflective mirrors.

8. The absorption spectrometer of claim 7 wherein said adjustable spacer varies spacing between said mirrors such that one of the periodic series of transmission peaks scans across an absorption band of the sample.

9. The absorption spectrometer of claim 7 further comprising a processor coupled to said optical spectrum analyzer for constructing absorption spectrum of the sample as a function of intensity versus wavelength spectrum.

10. The absorption spectrometer of claim 1 wherein said absorption signal generator comprises a micro-sphere cavity.

11. The absorption spectrometer of claim 10 wherein said absorption signal generator further comprises a first tapered optical waveguide that couples input light into the micro-sphere cavity, and a second tapered optical waveguide that couples light transmitted out of the micro-sphere cavity to the optical spectrum analyzer.

12. The absorption spectrometer of claim 11 wherein the absorption signal generator further comprises means for changing effective radius of the micro-sphere cavity to tune output intensity peaks as a function of wavelength.

13. The absorption spectrometer of claim 11 wherein the absorption signal generator further comprises micro positioning motors coupled to said first and second optical waveguides to change effective radius of the micro-sphere cavity to tune output intensity peaks as a function of wavelength.

14. The absorption spectrometer of claim 11 wherein the absorption signal generator further comprises MEMS based actuation device coupled to said first and second optical waveguides to change effective radius of the micro-sphere cavity to tune output intensity peaks as a function of wavelength.

15. A method for performing absorption spectroscopy, comprising:
    receiving a sample having a wavelength dependent transmission coefficient within an cavity having a multi-bounce optical path between a cavity input and a cavity output;
    traversing an optical beam across said sample along the multi-bounce optical path; and
    measuring intensity of cavity output as a function of wavelength.

16. The method of claim 15 wherein said cavity output comprises a periodic series of intensity peaks as a function of wavelength that are responsive to length of the multi-bounce optical path.

17. The method of claim 16 further comprising tuning said cavity to vary the length of said optical path to tune output intensity peaks as a function of wavelength.

18. An absorption spectrometer, comprising:
    an absorption signal generator comprising a microsphere cavity for receiving a sample and a tuning device for varying a length of a multi-bounce optical path traversed by an input optical beam from an input of said cavity to an output of said cavity to scan one of a plurality of periodic intensity peaks in transmission spectrum of said absorption signal generator across an absorption band of said sample; and
    an optical spectrum analyzer coupled to the output of said cavity for measuring intensity of said cavity output as a function of wavelength.

* * * * *